US012795315B2

(12) United States Patent
Bharitkar et al.

(10) Patent No.: US 12,795,315 B2
(45) Date of Patent: Nov. 10, 2026

(54) SPECTROGRAM BASED TIME ALIGNMENT FOR INDEPENDENT RECORDING AND PLAYBACK SYSTEMS

(71) Applicant: Samsung Electronics Co., Ltd., Suwon-si (KR)

(72) Inventors: Sunil Bharitkar, Stevenson Ranch, CA (US); Allan Devantier, Santa Paula, CA (US); Ashish Y. Rawat, Valencia, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/790,528

(22) Filed: Jul. 31, 2024

(65) Prior Publication Data

US 2025/0048050 A1 Feb. 6, 2025

Related U.S. Application Data

(60) Provisional application No. 63/530,893, filed on Aug. 4, 2023.

(51) Int. Cl.
*H04S 7/00* (2006.01)
*H04R 29/00* (2006.01)

(52) U.S. Cl.
CPC ........... *H04S 7/301* (2013.01); *H04R 29/001* (2013.01)

(58) Field of Classification Search
CPC .............................. H04S 7/301; H04R 29/001
USPC ....................................... 381/56, 58, 60, 303
See application file for complete search history.

(56) References Cited

U.S. PATENT DOCUMENTS

| | | | | |
|---|---|---|---|---|
| 6,970,568 | B1 | 11/2005 | Freeman et al. | |
| 9,706,299 | B2 * | 7/2017 | Talwar | H04R 1/406 |
| 10,582,299 | B1 | 3/2020 | Mansour et al. | |
| 10,638,221 | B2 | 4/2020 | King et al. | |

(Continued)

FOREIGN PATENT DOCUMENTS

| | | | |
|---|---|---|---|
| CN | 116320886 | A | 6/2023 |
| JP | 2010 212818 | A | 9/2010 |

(Continued)

OTHER PUBLICATIONS

International Search Report and Written Opinion dated Nov. 27, 2024 for International Application PCT/IB2024/057561, from Korean Intellectual Property Office, pp. 1-11, Republic of Korea.

(Continued)

*Primary Examiner* — William A Jerez Lora
(74) *Attorney, Agent, or Firm* — Sherman IP LLP; Kenneth L. Sherman; Steven Laut

(57) ABSTRACT

One embodiment provides a computer-implemented method that includes sending a stimulus signal to a loudspeaker. A measurement signal is received via a microphone. The stimulus signal is transformed into a stimulus time-frequency representation. The measured signal is transformed into a measured time-frequency representation. At least one frequency value is selected between the stimulus time-frequency representation and the measured time-frequency representation. Correlation analysis is performed using the selected at least one frequency value. Based on the correlation analysis, a statistical mode is determined to produce a start-time of the stimulus signal.

20 Claims, 15 Drawing Sheets

(56) References Cited

U.S. PATENT DOCUMENTS

| | | | | |
|---|---|---|---|---|
| 11,217,269 | B2 | 1/2022 | Song | |
| 2021/0375276 | A1 | 12/2021 | Pereira et al. | |
| 2021/0375287 | A1* | 12/2021 | Nesiba | B60R 16/0373 |
| 2023/0052010 | A1 | 2/2023 | Bharitkar | |
| 2023/0199414 | A1 | 6/2023 | Griffiths et al. | |
| 2023/0217171 | A1* | 7/2023 | Shin | H04R 27/00<br>381/17 |
| 2023/0247353 | A1* | 8/2023 | Ali | H04R 3/00<br>381/17 |

FOREIGN PATENT DOCUMENTS

| | | |
|---|---|---|
| KR | 10-2012-0046133 A | 5/2012 |
| KR | 10-2017-0052056 A | 5/2017 |

OTHER PUBLICATIONS

Morise, M. et al., "Loudspeaker equalization based on multi-location observation with reliable time-frequency region selection and its evaluation using sound propagation measurement", 12th European Signal Processing Conference IEEE, Sep. 6, 2004 (Sep. 6, 2004), pp. 1995-1998, IEEE, United States.

Extended European Search Report dated Jul. 17, 2026 for European Patent Application No. 24851215.4, from European Patent Office, pp. 1-11, Munich, Germany.

* cited by examiner

500

600

700

800

900

1100

1200

1300

1600

1700

1900

1800

2200

2100

2000

SPECTROGRAM BASED TIME ALIGNMENT FOR INDEPENDENT RECORDING AND PLAYBACK SYSTEMS

CROSS-REFERENCE TO RELATED APPLICATIONS

This application claims the priority benefit of U.S. Provisional Patent Application Ser. No. 63/530,893, filed on Aug. 4, 2023, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to time alignment for independent recording and playback, and in particular, to providing spectrogram-based time alignment for independent recording and playback systems.

BACKGROUND

In-room speaker system equalization was traditionally implemented by exciting one speaker at a time. With a higher number of speakers, restrictions of measurement microphone setup, the annoyance factor due to traditional stimuli, and background noises, the process of measuring the impulse response of a multi-channel system in real-time can be cumbersome. With fast Fourier transform (FFT) computation restrictions on a smartphone digital signal processing (DSP), the accuracy and resolution of the impulse responses are compromised.

SUMMARY

One embodiment provides a computer-implemented method that includes sending a stimulus signal to a loudspeaker. A measurement signal is received via a microphone. The stimulus signal is transformed into a stimulus time-frequency representation. The measured signal is transformed into a measured time-frequency representation. At least one frequency value is selected between the stimulus time-frequency representation and the measured time-frequency representation. In some embodiments, correlation (e.g., linear correlation) analysis is performed using the selected at least one frequency value. Based on the correlation analysis, a statistical mode is determined to produce a start-time of the stimulus signal. In some embodiments, a nonlinear analysis including a nonlinear model (e.g., a neural network) can be trained to identify a start-time or stop-time of the stimulus signal in a recording.

Another embodiment includes a non-transitory processor-readable medium that includes a program that when executed by a processor provides a start-time of a stimulus in a measurement, including sending, by the processor, a stimulus signal to a loudspeaker. The processor receives, via a microphone, a measurement signal. The processor transforms the stimulus signal into a stimulus time-frequency representation. The processor further transforms the measured signal into a measured time-frequency representation. The processor additionally selects at least one frequency value between the stimulus time-frequency representation and the measured time-frequency representation. The processor further performs correlation (e.g., linear correlation) analysis using the selected at least one frequency value. The processor additionally determines, based on the correlation analysis, a statistical mode to produce a start-time of the stimulus signal.

Still another embodiment provides an apparatus that includes a memory storing instructions, and at least one processor executes the instructions including a process configured to send a stimulus signal to a loudspeaker. A measurement signal is received via a microphone. The stimulus signal is transformed into a stimulus time-frequency representation. The measured signal is transformed into a measured time-frequency representation. At least one frequency value is selected between the stimulus time-frequency representation and the measured time-frequency representation. Correlation analysis is performed using the selected at least one frequency value. Based on the correlation analysis, a statistical mode is determined to produce a start-time of the stimulus signal.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
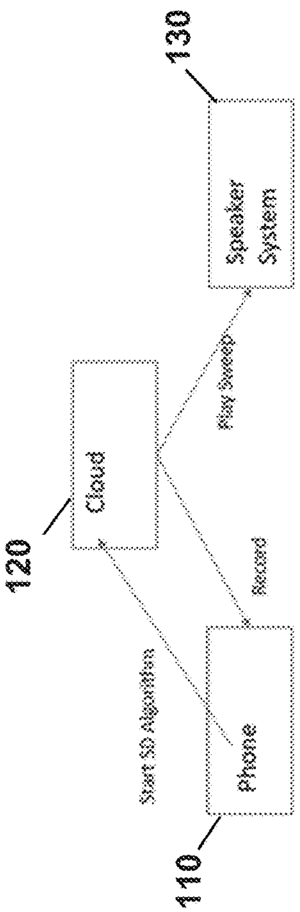
FIG. 1 is an example architecture for a measurement setup, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

Some embodiments relate generally to time alignment for independent recording and playback, and in particular, to providing spectrogram based time alignment for independent recording and playback systems. One embodiment provides a computer-implemented method that includes accessing a stimulus signal at each of multiple frequency bands. A measured signal is accessed at each of the multiple frequency bands. The stimulus signal is transformed into a stimulus time-frequency representation. The measured signal is transformed into a measured time-frequency representation. At least one frequency value is selected between the stimulus time-frequency representation and the measured time-frequency representation. Correlation analysis is performed using the selected at least one frequency value. Based on the correlation analysis, a statistical mode is determined to estimate a start-time of the stimulus signal from the measurement signal.

In one or more embodiments, the disclosed technology implements a simultaneous deconvolution of a multichannel speaker system. Some embodiments use a set of circularly shifted sine-sweep stimuli to excite the speakers and calculate the impulse responses in real-time on a smartphone (or other similar device, such as a tablet, etc.) App over a cloud computing-based architecture. An independent recording and playback system, along with manual delays or system delays due to Bluetooth, Wi-Fi, or cloud-based communication, pose further challenges to the accuracy of measurements. To surmount these complications, one or more embodiments implement a time-alignment method that uses bin-wise matched filtering of spectrograms, followed by a statistical analysis of its results.

In some embodiments, simultaneous deconvolution processing calculating impulse response estimate uses the log-sweep autocorrelation inverse spectrum and the cross correlation shown in Equation (Eq.) (1).

$$h_j(n) = w_j(n) \circledast \rho_{(x_j(n), y(n))} \quad \text{Eq. (1)}$$

where, $$w_j(n) = \mathcal{F}^{-1}\left\{\frac{1}{S_{x_j, x_j}}\right\}$$

$$S_{(x_j, x_j)} = \mathcal{F}\left\{\rho_{(x_j, x_j)}\right\}$$

Input signal: $x(n)=x(t)|_{t=nT_S}$ where x (t) is from Eq. (1).

$$x_i(n) = \begin{pmatrix} x(n-(i-1)M > p) \\ x(\langle n-(i-1)M-1\rangle p) \\ \vdots \\ x(\langle n-(i-1)M-P+1\rangle p) \end{pmatrix}$$

$$(i = 2, \ldots, 12).$$

Note that for an N channel speaker system, $j^{th}$ channel input is one of the log-sweeps, which is circularly shifted by <M>P.

Accurate impulse response calculations from a deconvolution operation calls for high resolution fast Fourier transform (FFT). In some embodiments, an on-device implementation of a simultaneous deconvolution process as a smartphone App may be restricted with the length of the FFT, which can be implemented on the processor. The App often runs into overruns attempting to implement a high resolution FFT. In order to solve the problems of hardware overruns, in one or more embodiments the processing is performed on a cloud computing-based processor. In some embodiments, an App is implemented using MATLAB Mobile or other similar tools. In one example embodiment, the architecture to implement the simultaneous deconvolution processing/algorithm App may be built using the MATLAB Mobile's connect to MATHWORKS® cloud feature. This enables implementation of an FFT of length in the magnitude of, for example, 219 (required for an example App) and above, which is sufficient to deconvolve sweeps of about the same length.

FIG. 1 is an example architecture for a measurement setup, according to some embodiments. The example architecture includes a phone 110 (e.g., a smartphone, tablet, etc.), a cloud computing environment 120 (e.g., one or more cloud computing devices, servers, etc.) and a speaker system 130 (e.g., a home theatre system, a sound bar, etc.). In one or more embodiments, simultaneous deconvolution processing/algorithm App is started from the phone 110. The cloud computing environment 120 plays a sweep and the phone 110 records the measurements. In some embodiments, measurements may be evaluated from those taken with the phone 110 with its internal microphone and with an external measurement microphone. In one or more embodiments, the recording from the phone 110 is sent to the cloud computing environment 120 where the processing/algorithm is implemented. The example architecture suggests the use of a cloud computing-based control to synchronize the start and stop time for the recording and the playback from the speaker system 130.

Figure 2A:
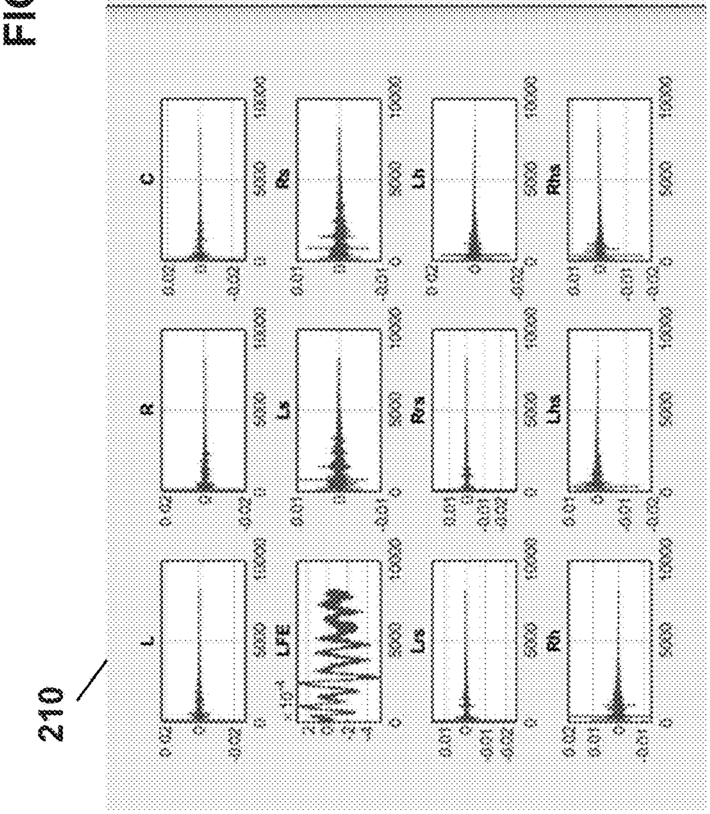
FIG. 2A illustrates example impulse responses deconvolved for multiple channels using the disclosed technology, according to some embodiments.

FIG. 2A illustrates example impulse responses 210 deconvolved for multiple channels using the disclosed technology, according to some embodiments. In the example impulse responses, the disclosed technology the signal aligned at 3.873 seconds. The channels included left channel (L), right channel (R), center channel (C), low frequency effects (LFE) or subwoofer channel, left surround channel (Ls), right surround channel (Rs), left rear surround (Lrs), right rear surround (Rrs), left height channel (Lh), right height channel (Rh), left height surround channel (Lhs) and right height surround channel (Rhs).

Figure 2B:
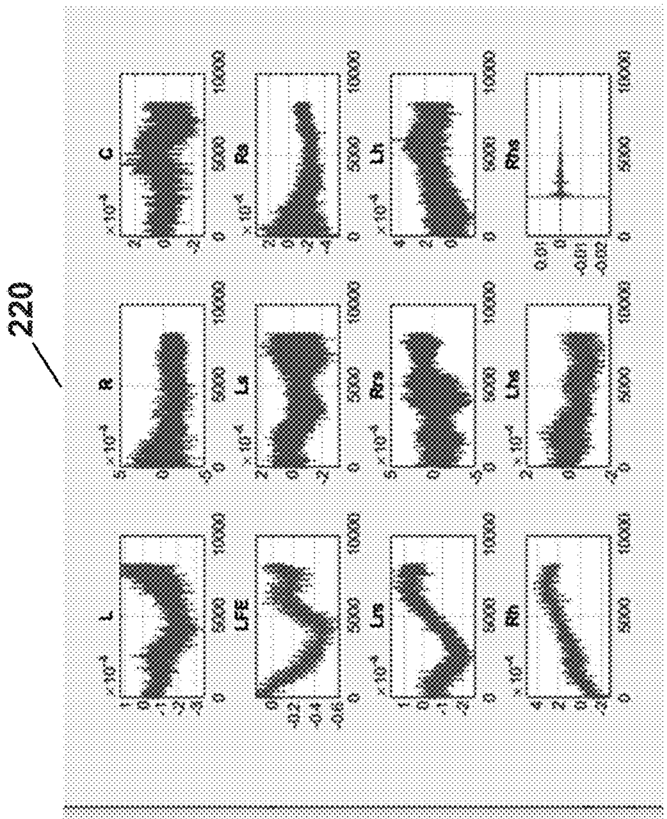
FIG. 2B illustrates example impulse responses deconvolved for multiple channels using a threshold-based signal alignment.

FIG. 2B illustrates example impulse responses 220 deconvolved for multiple channels using a threshold-based signal alignment. In the example impulse responses, the threshold-based signal alignment signal aligned at 3.027 seconds. The channels included L, R, C, LFE (or subwoofer channel), Ls, Rs, Lrs, Rrs, Lh, Rh, Lhs and Rhs.

Figure 3A:
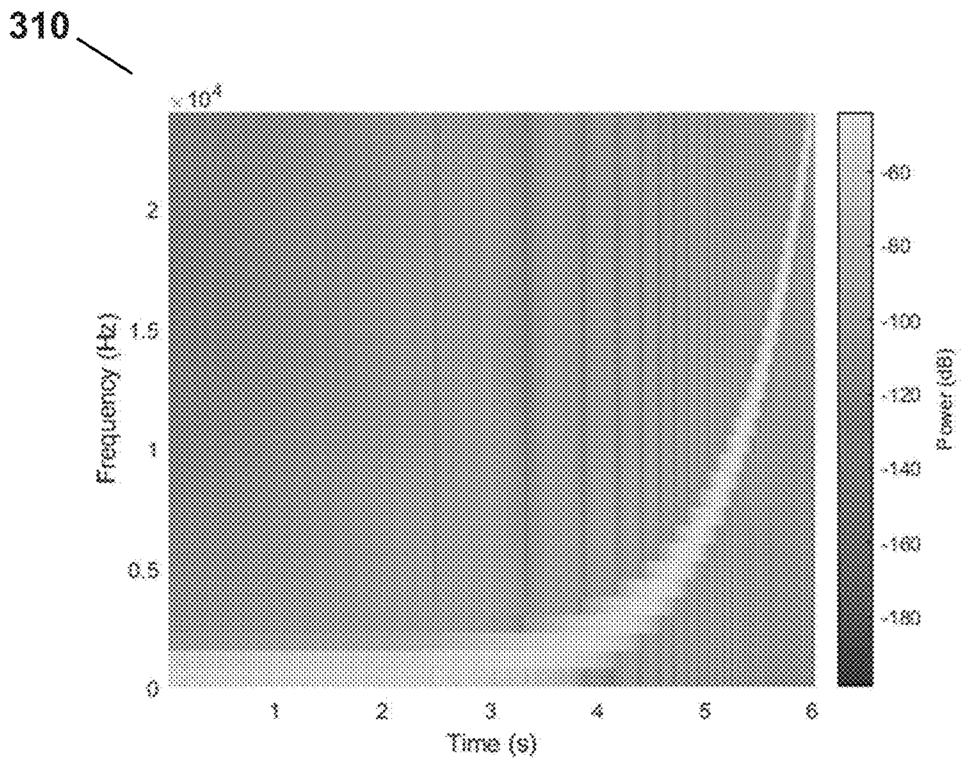
FIGS. 3A-B illustrate example graphs resulting from bin-wise matched filtering using cross correlation based on a time alignment technique using a single channel sweep, according to some embodiments.
Figure 3B:
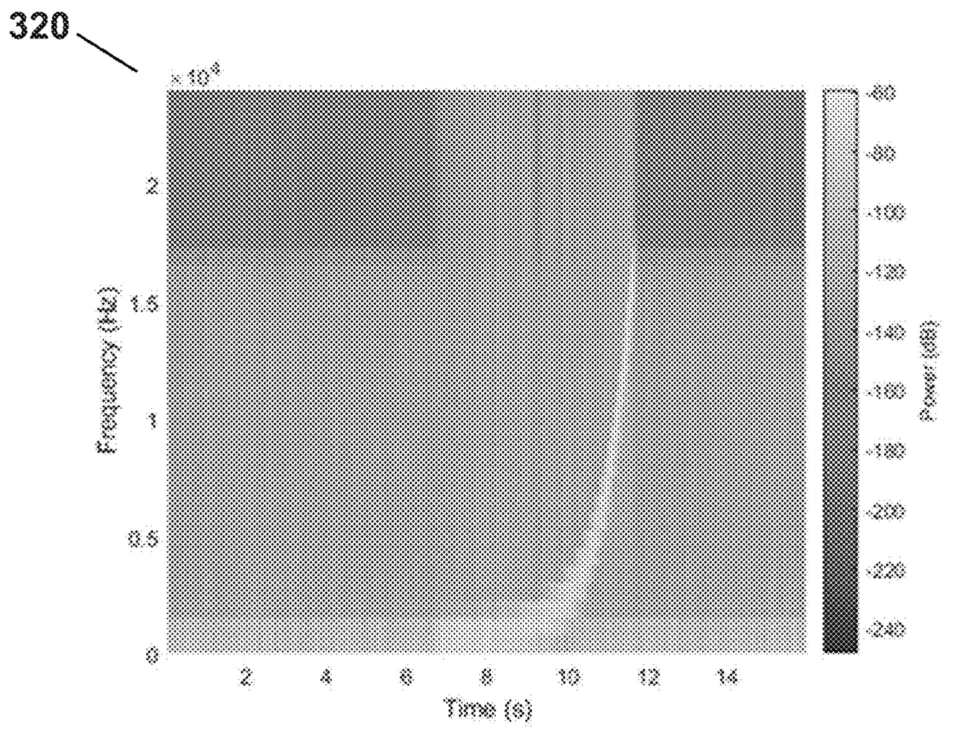
Figure 3C:
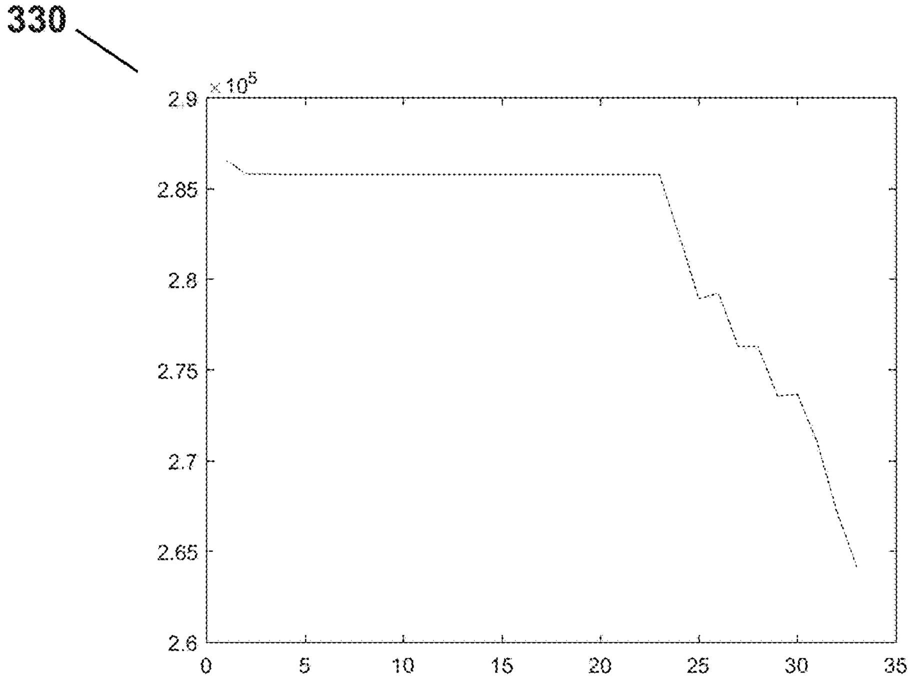
FIG. 3C illustrates an example graph based on the example graphs of FIGS. 3A-B for statistical mode of the start-time plot.

FIGS. 3A-B illustrate example graphs 310 and 320 resulting from bin-wise matched filtering using cross correlation based on a time alignment technique using a single channel sweep, according to some embodiments. In some embodiments, in a real-time smartphone application for measuring a speaker system using an N channel deconvolution (N≥1) operation, the start-time of the sweep in the recorded signal may need to be estimated for accurately deconvolving the in-room loudspeaker impulse response. If the start-time is not correctly estimated from the recorded signal, the result is skewed and noisy impulse responses, hence inaccurate calculations of relative loudspeaker delays and levels at the microphone position. Start-time estimation approaches using thresholding-based methods are heavily influenced by room-reflections, background noise, and buffer time between input and recorded signals, and can lead to distorted impulses. FIG. 3C illustrates an example graph 330 based on the example graphs of FIGS. 3A-B for statistical mode of the start-time plot.

Figure 4:
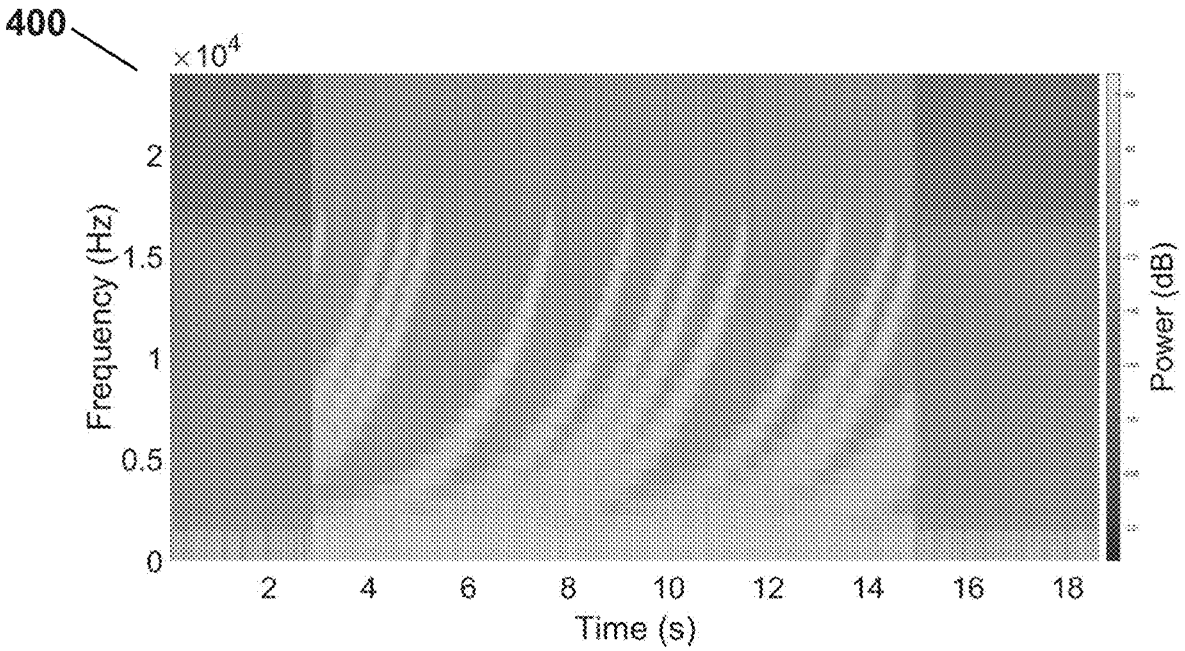
FIG. 4 illustrates an example recording spectrogram, according to some embodiments.
Figure 5:
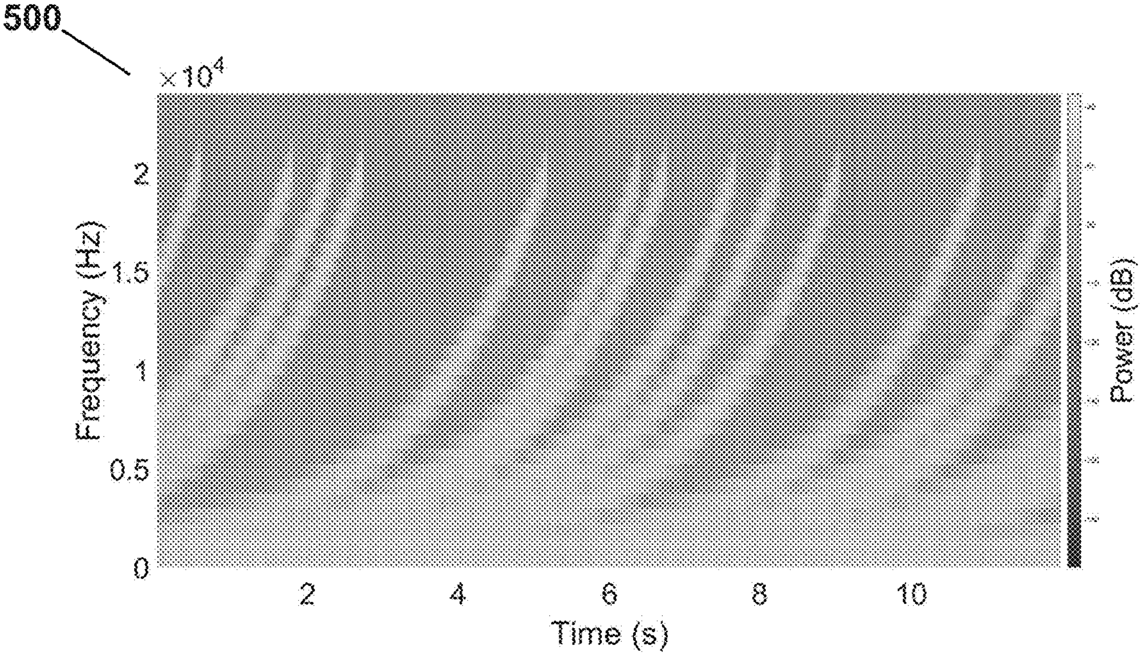
FIG. 5 illustrates an example input stimuli spectrogram, according to some embodiments.

FIG. 4 illustrates an example recording spectrogram 400, according to some embodiments. FIG. 5 illustrates an example input stimuli spectrogram 500, according to some embodiments. A high time resolution spectrogram (window: 64 samples and overlap: 50%) based time alignment is robust and reliable in real-time applications. Some embodiments use a frequency bin-wise matched filtering of two spectrograms (e.g., as shown in FIGS. 4 and 5). FIGS. 4 and 5 represent a recording spectrogram and the input stimuli spectrogram respectively. Note that this technique is independent of the number of channels being deconvolved and hence the disclosed technology can be used to time align (N>1) channels at a time. Spectrogram 400 shows graphically how this time alignment technique can be implemented on a multi-channel exponential sine sweep (i.e., multiple exponential sweeps being applied to multiple loudspeakers simultaneously). Statistical analysis of the start-times derived for each frequency bin can yield the actual start-time of the stimuli captured in the recording. In one or more embodiments, a statistical mode is used.

In one or more embodiments, the following equations provide clarity on the processing/algorithm implemented. Cross-correlation of two frequency bins $S_M$ and $S_{ideal}$:

$$\mathrm{corr}(S_M, S_{ideal})[m] = \sum_{n=0}^{N-1} S_M[n] \cdot S^*_{ideal}[n-m] \qquad \text{Eq. (3)}$$

where, $S_M[n]$ and $S_{ideal}[n]$ are the nth elements of measured and ideal stimuli spectrogram frequency bin. The technique can be readily extended to include joint-analysis over multiple frequency bins from the spectrogram. This cross correlation is executed over length N with shift m.

$$\max_{corr} = \max(\mathrm{corr}(S_M, S_{ideal})) \qquad \text{Eq. (4)}$$

Note that: $lag(S_{peak\_index}) = \mathrm{index}(\max_{corr})$ $$arrivalTime = lag(S_{peak\_index}) \qquad \text{Eq. (5)}$$

Figure 6:
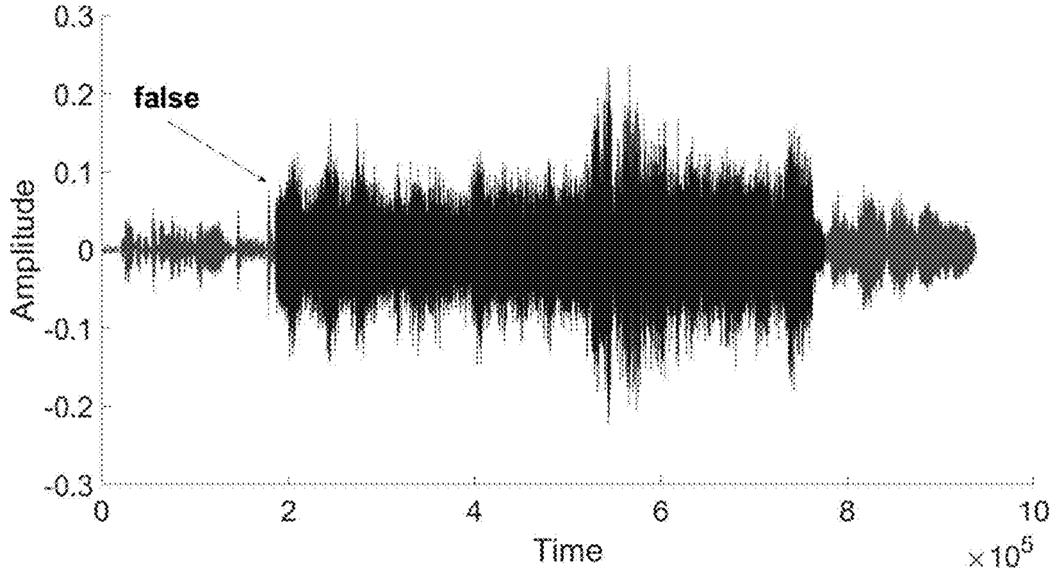
FIG. 6 illustrates an example time domain plot of a noisy recording.

FIG. 6 illustrates an example time domain plot 600 of a noisy recording (taken from the simultaneous deconvolution processing/algorithm App). This recording arises from a noisy environment with speech and impulsive noises (non-stationary). The environment replicates a real-world scenario in which an end user of a smartphone App may be located within. The beginning and end regions represent pre-stimuli and post-stimuli buffer regions. The center region represents the recording of stimuli that should be used for deconvolution with the original stimuli. If an amplitude threshold-based approach is used for start-time detection, a false impulsive noise detected as the start-time can be seen. In one or more embodiments, the actual stimuli are detected using the disclosed technology with an accuracy of 64 samples (frequency resolution of the spectrogram).

Figure 7:
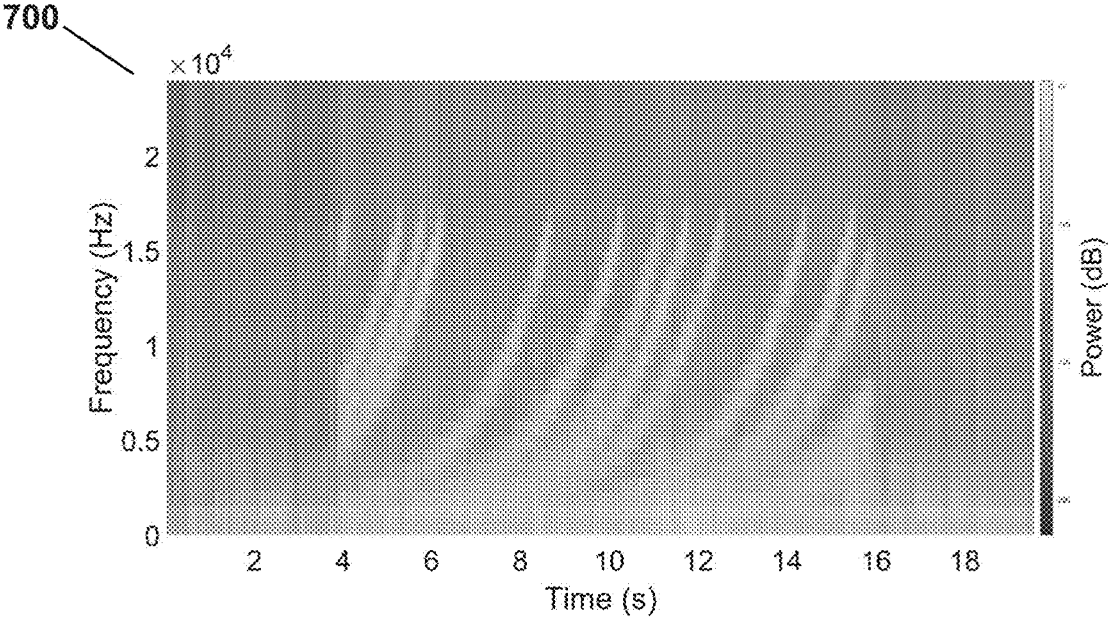
FIG. 7 illustrates an example spectrogram of the noisy recording of FIG. 6.

FIG. 7 illustrates an example spectrogram 700 of the noisy recording plot 600 of FIG. 6, according to some embodiment. In one or more embodiments, a spectrogram, such as spectrogram 700, is used for calculating the start and stop time of the noisy recording accurately. A clean and accurate impulse response 900 (FIG. 9) is calculated using the simultaneous deconvolution processing/algorithm App of the disclosed technology. If an alternative start-time detection based on threshold in time or frequency domain is used, start-time is detected erroneously and hence obtains a noisy, inaccurate impulse response 800 (FIG. 8).

Figure 8:
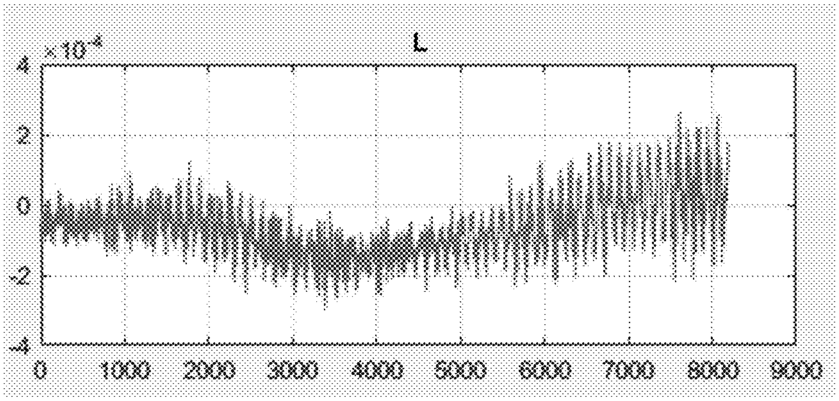
FIG. 8 illustrates an example impulse response plotted on a smartphone App using a false start-time under non-stationary noise, according to some embodiments.

FIG. 8 illustrates an example impulse response 800 plotted on a smartphone App using a false start-time under non-stationary noise, according to some embodiments. The impulse response 800 shown is plotted on a smartphone App using the false start-time (calculated using the threshold-based approach) under nonstationary noise.

Figure 9:
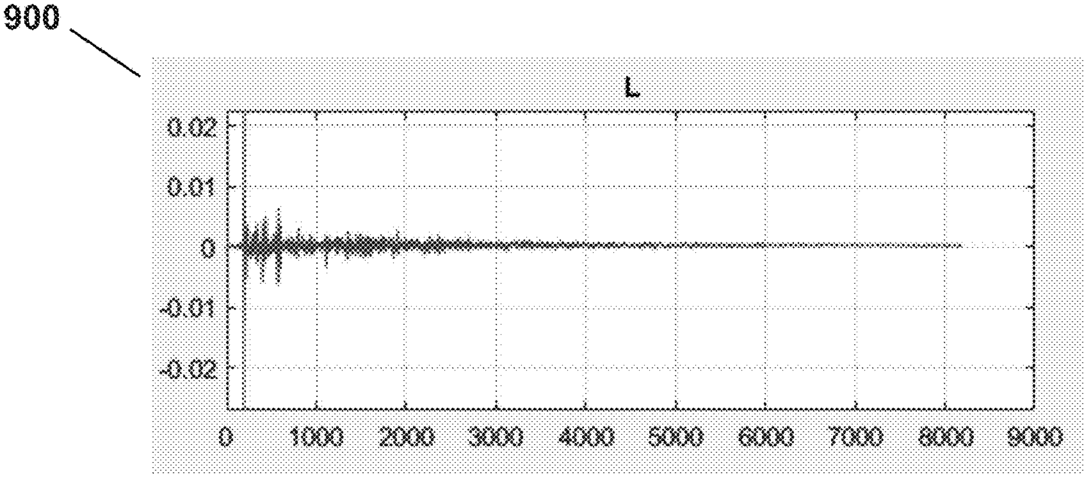
FIG. 9 illustrates an example impulse response plotted on a smartphone App using a false start-time under non-stationary noise, according to some embodiments.

FIG. 9 illustrates an example impulse response 900 plotted on a smartphone App using a correctly identified start-time under non-stationary noise, according to some embodiments. Impulse response 900 is plotted on the smartphone App using the accurate start-time (calculated using the spectrogram-based approach) under non-stationary noise.

The start-time detected by the disclosed technology versus erroneously by a conventional method varies about 0.8 sec and the impact caused by the false start-time is drastically observed in the impulse response 800 (FIG. 8).

Figure 10:
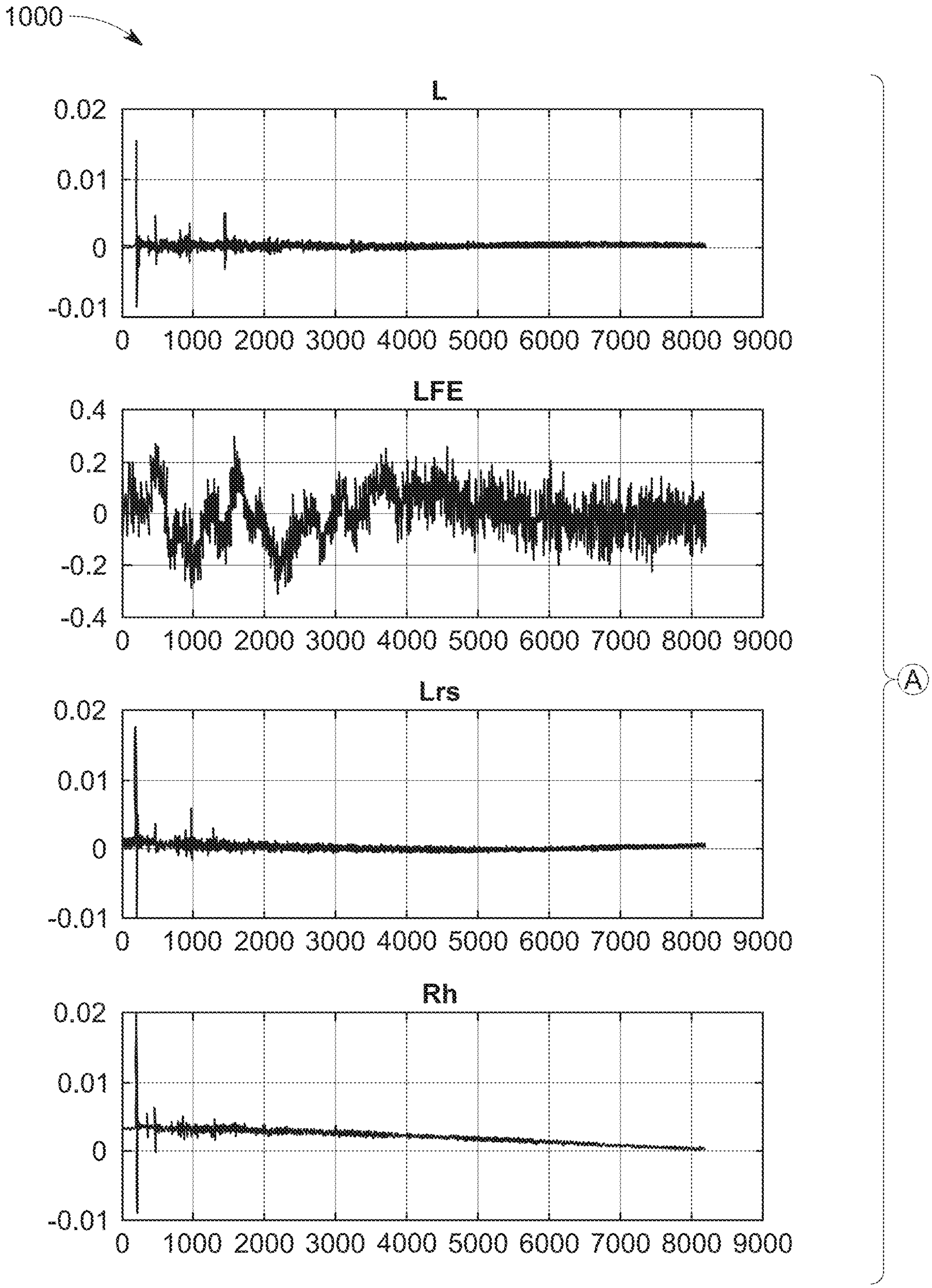
FIG. 10 illustrates example plots of impulse response using a smartphone App with OdB signal to noise ratio (SNR) (stationary noise), according to some embodiments.
Figure 10:
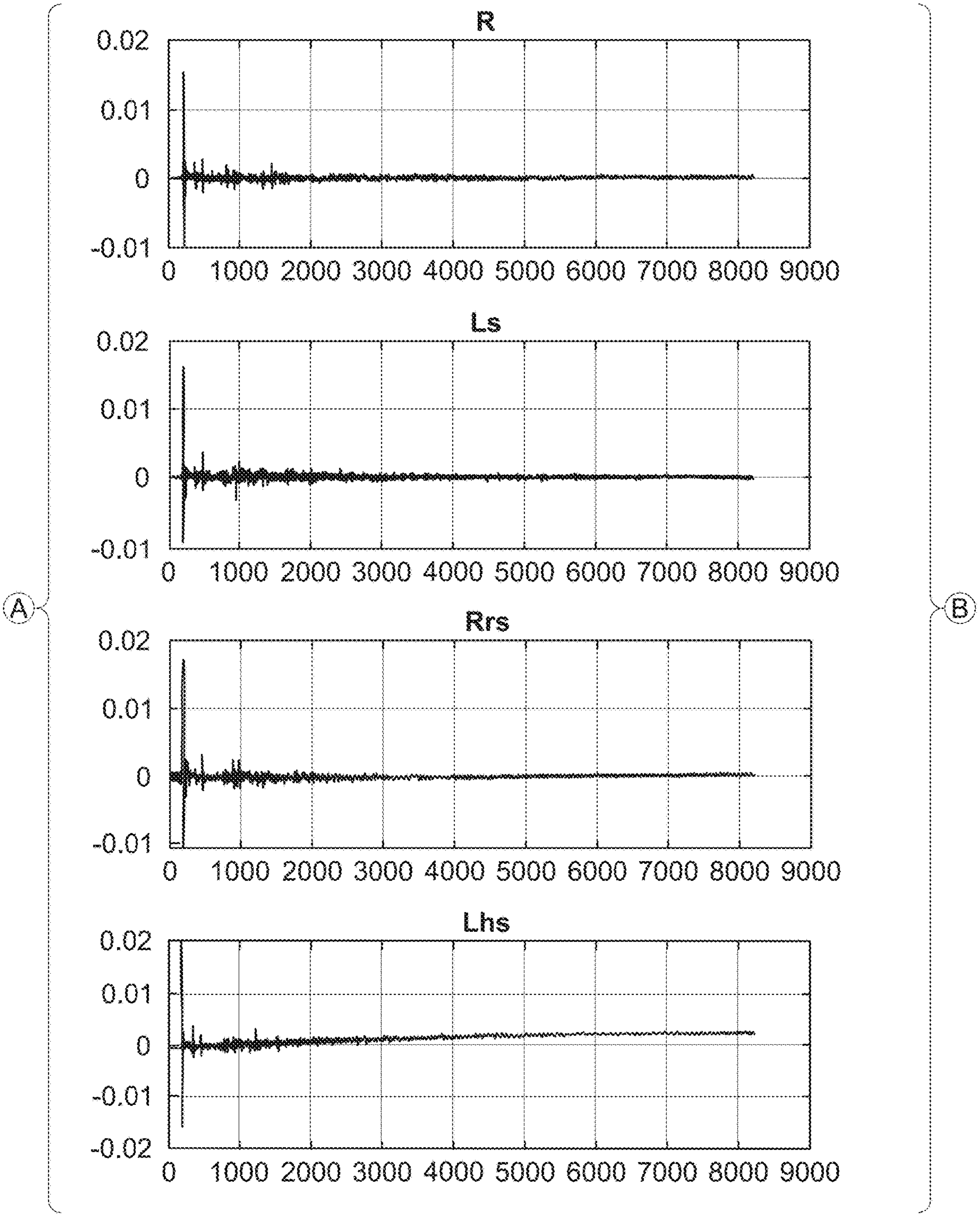
Figure 10:
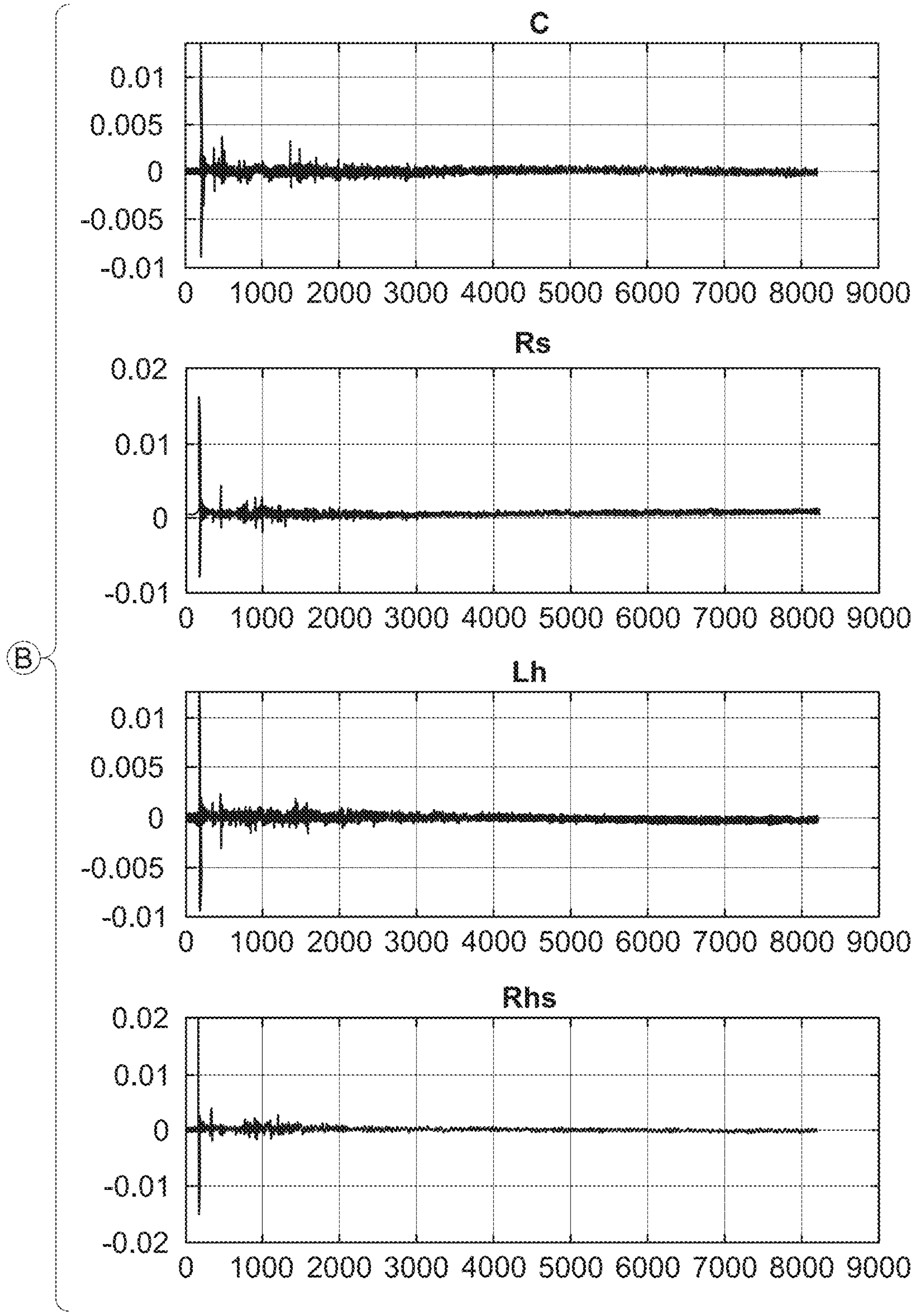

FIG. 10 illustrates example plots 1000 of impulse responses using a smartphone App with OdB signal to noise ratio (SNR) (stationary noise), according to some embodiments. The channels included in the example plots 1000 include L, R, C, LFE (or subwoofer channel), Ls, Rs, Lrs, Rrs, Lh, Rh, Lhs and Rhs.

Figure 11:
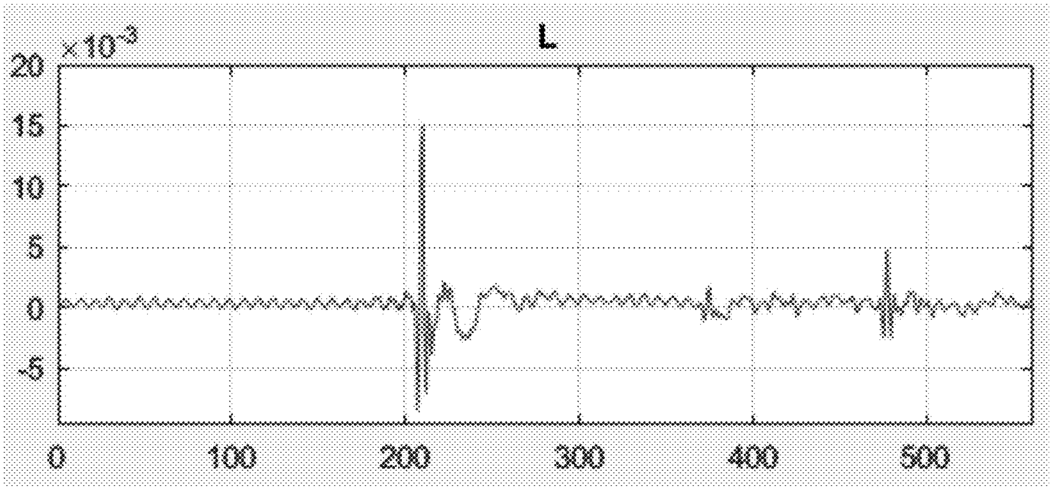
FIG. 11 illustrates an example impulse response of a main channel using a smartphone App with OdB SNR (stationary noise), according to some embodiments.
Figure 12:
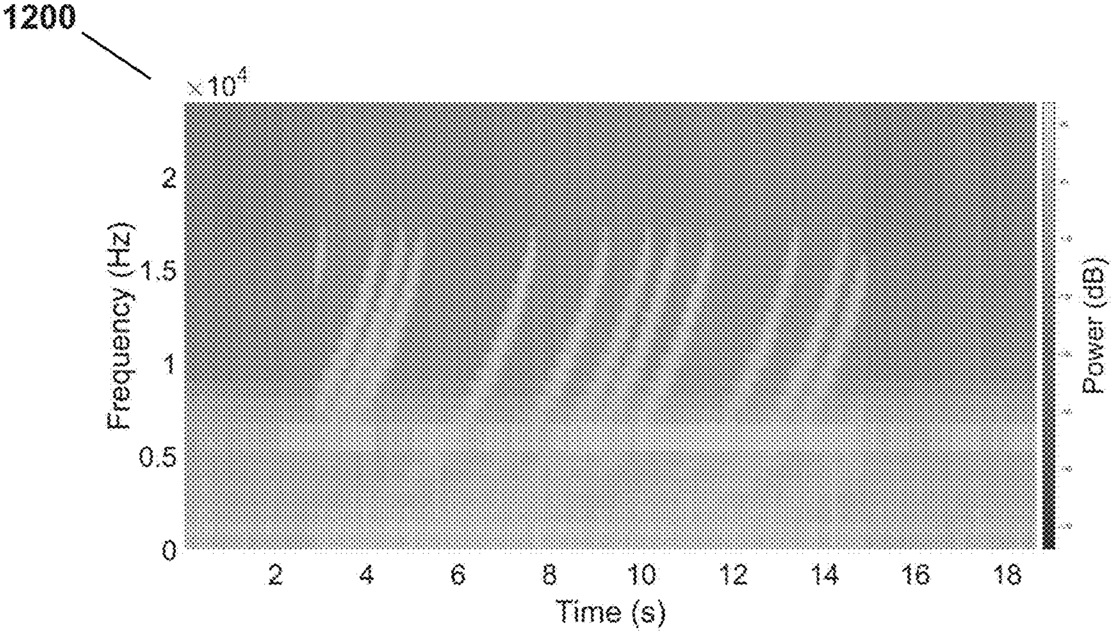
FIG. 12 illustrates an example spectrogram of a OdB SNR noisy recording (stationary), according to some embodiments.

FIG. 11 illustrates an example impulse response 1100 of a main channel (L) using a smartphone App with OdB SNR (stationary noise), according to some embodiments. FIG. 12 illustrates an example spectrogram 1200 of a 0 dB SNR noisy recording (stationary), according to some embodiments. The start-time and end-time alignment using a spectrogram was tested with vacuum cleaner noise (stationary) at OdB SNR. The impulse response 1100 generated for the speakers is clean and useful for delay and level correction except the subwoofer (LFE) impulse response, which gets corrupted due to the low frequency content of the noise. This can be seen in the spectrogram of the noisy recording in spectrogram 1200, while the clean impulse can be seen in impulse response 1100.

Figure 13:
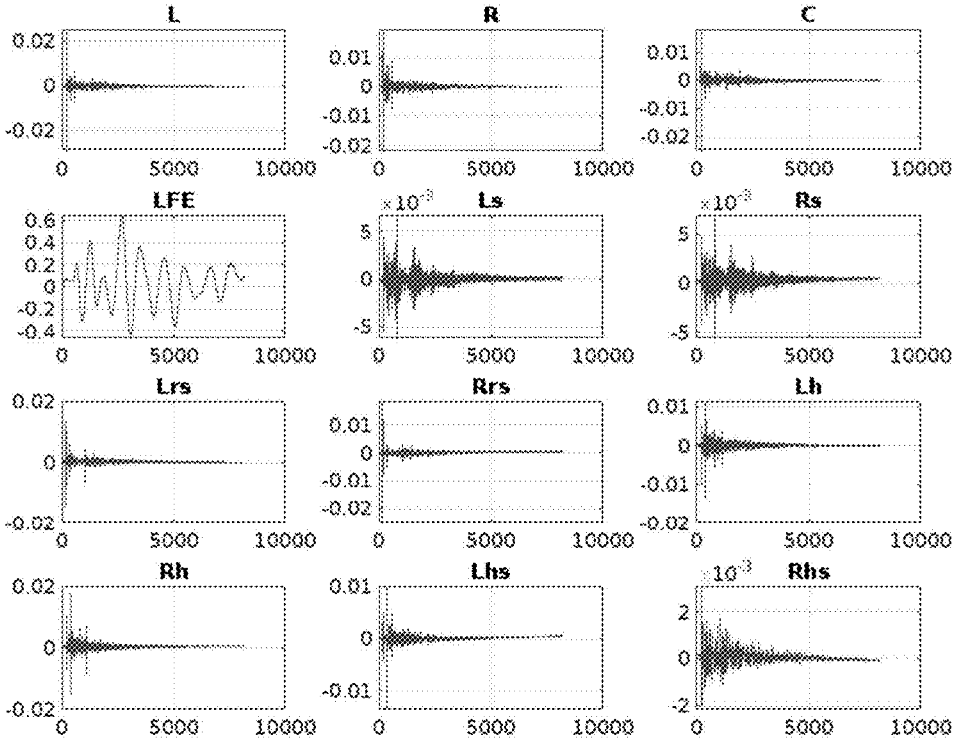
FIG. 13 illustrates an example of impulse responses of twelve (12) channels measured using an external microphone for a soundbar using the disclosed technology, according to some embodiments.

FIG. 13 illustrates an example of impulse responses 1300 of twelve (12) channels measured using an external microphone for a soundbar using the disclosed technology, according to some embodiments. The channels included in the example plots 1000 include L, R, C, LFE (or subwoofer channel), Ls, Rs, Lrs, Rrs, Lh, Rh, Lhs and Rhs. Channel 4 shows the impulse response of the sub-woofer labeled as LFE. As expected, only the low frequency component present shows the impulse response. Relative delays for each channel are calculated by prominence of peak. The function for prominence is implemented using a "findpeaks" function, which returns a vector with the local maxima (peaks) of the input signal vector, data.

$$P = H - \min(L, R) \qquad \text{Eq. (6)}$$

In Eq. (6), P is the prominence of the peak, H is the height or amplitude of the peak, L and R are the left and right valley. The first peak of the impulse response that is found is above a certain threshold of the prominence.

$$\text{peak\_index} = \underset{i}{\operatorname{argmin}}(P(|IR[i]| > P_t \qquad \text{Eq. (7)}$$

In Eq. (7), P(x[i]) is prominence of peak at $i^{th}$ sample in impulse response (IR), and P, is the threshold value for prominence to detect a valid peak. In order to calculate relative channel delay Eq. (8) is implemented as:

$$MeasuredDelay_{i,j} = TOA_i - TOA_j \qquad \text{Eq. (8)}$$

In Eq. (8), $TOA_i$ is the time of arrival for the $i^{th}$ channel, which is calculated from the known sampling frequency and the peak_index in Eq. (7).

$$RelativeDist_{i,j} = ActualDist_i - ActualDist_j \qquad \text{Eq. (9)}$$

In Eq. (9), $RelativeDist_{i,j}$ is the actual relative distance between speakers for channel i and j respectively. This distance is calculated using the difference between the measured distance of the microphone from the speakers for channel i and j. This measurement may be performed using a laser rangefinder or similar device.

Figure 14:
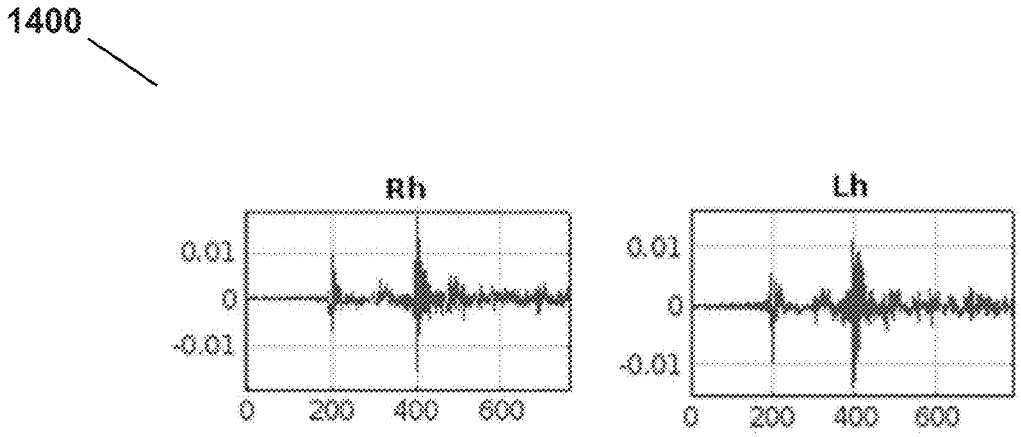
FIG. 14 illustrates a closeup view of the impulse response plots of the height channels shown in FIG. 13, according to some embodiments.

FIG. 14 illustrates a closeup view 1400 of the impulse response plots 1300 of the height channels (Rh and Lh) shown in FIG. 13, according to some embodiments. In the example embodiment, the impulse responses of the Rh and Lh are recorded from an example soundbar for ceiling reflection analysis. Direct flight delays for the height channels can be calculated with Eqs. (6) to (8) on the first impulse response, and the first reflection delay with Eqs. (6) to (8) on the second impulse response observed in the closeup view 1400. Since the height channels on soundbars are directed towards the ceiling, the first reflection impulse response is more prominent than the direct flight impulse response.

$$\text{Error}_{i,j} = \text{Delay}(\text{Relative}_{i,j}) - \text{Delay}(\text{Measured}_{i,j}) \qquad \text{Eq. (10)}$$

Eq. (10) shows that $\text{Error}_{i,j}$ is the difference between actual relative delay: Delay ($\text{Relative}_{i,j}$) and the delay measured using Eq. (8): Delay ($\text{Measured}_{i,j}$).

Figure 15:
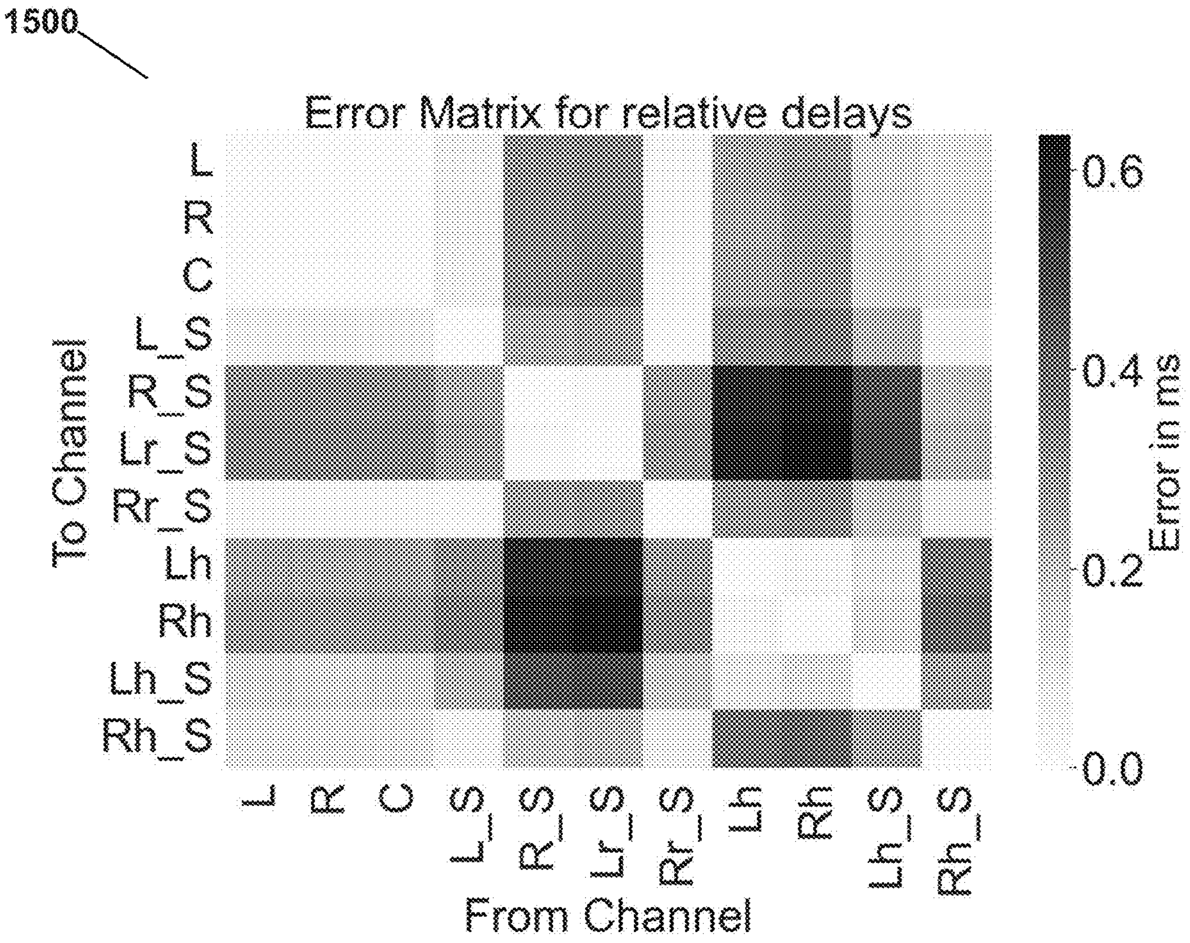
FIG. 15 illustrates an example heatmap of relative channel delay error, according to some embodiments.

FIG. 15 illustrates an example heatmap 1500 of relative channel delay error, according to some embodiments. In one or more embodiments, an error matrix for relative channel delays is displayed using heatmap 1500, which shows that with the disclosed technology and its implementation of a simultaneous deconvolution processing/algorithm App there is a relative channel delay error under 1 ms for all the channels. In some embodiments, delay for the sub-woofer/LFE channel is implemented based on maximizing the summation of sub-woofer and main channel's frequency response. This maximization is evaluated by delaying the impulse response of the sub-woofer and the main channel iteratively and then minimizing the standard deviation of the frequency response over a cross-over region. Once it is found that N sample (t ms) delay of either the main or sub-woofer yields the least standard deviation of frequency response in the cross-over region, the required delay for the system and time alignment of all the channels can be determined that is best suited for the listener's position.

Figure 16:
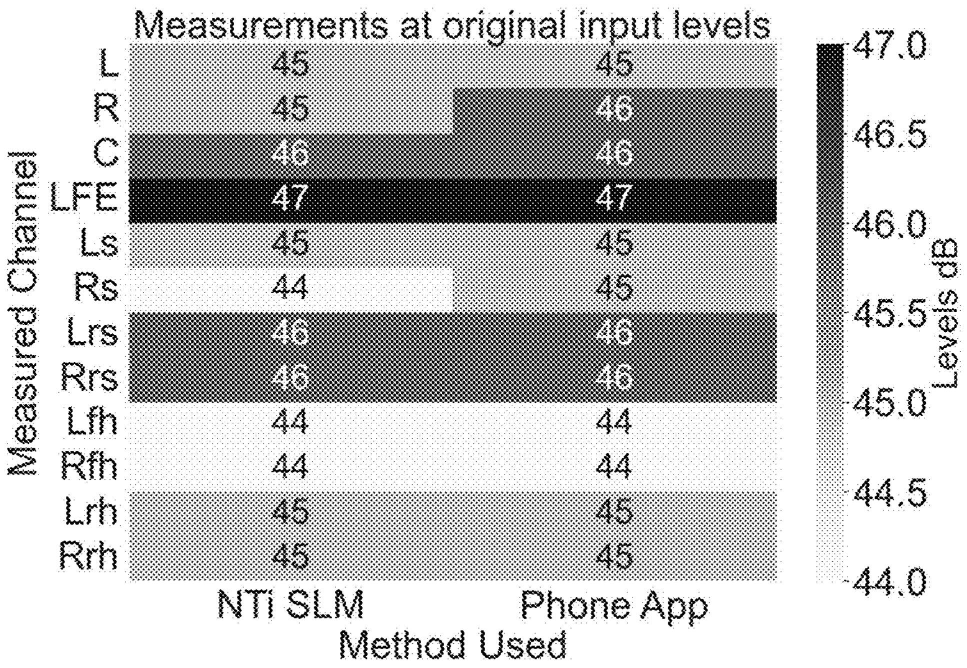
FIG. 16 illustrates an example level measurement heatmap for accuracy of measured levels with a smartphone versus a sound level meter, according to some embodiments.

FIG. 16 illustrates an example level measurement heatmap 1600 for accuracy of measured levels with a smartphone versus a sound level meter, according to some embodiments. In one or more embodiments, sound power level (SPL) can be calculated using the impulse responses derived from the simultaneous deconvolution processing/algorithm App. Level equalization for the speakers can be conducted for the primary listener's position based on this.

$$H = \mathcal{F}(\text{Impulse}_{Response_i}) \qquad \text{Eq. (11)}$$

$$X = \mathcal{F}(\text{Pink}_{Noise})$$

In Eq. (11), H and X are the FFTs of the impulse response (derived with the simultaneous deconvolution processing/algorithm App for the $i^{th}$ channel) and pink noise (with a reference SPL), respectively. The FFT length used is determined by: length (Impulse_Responsei)+length (Pink_Noise)−1.

$$y_i\left(\mathrm{Real}\left(\mathcal{F}^{-1}(H * X')\right)\right)' \quad \text{Eq. (12)}$$

In Eq. (12), $y_i$ is the time domain convolution of the pink noise (measured) and the impulse response (calculated using the simultaneous deconvolution processing/algorithm App).

$$\mathrm{spl\_ch}_i = 20 * \log 10\left(\mathrm{rms}(y_i)/ref\right) \quad \text{Eq. (13)}$$

Figure 17:
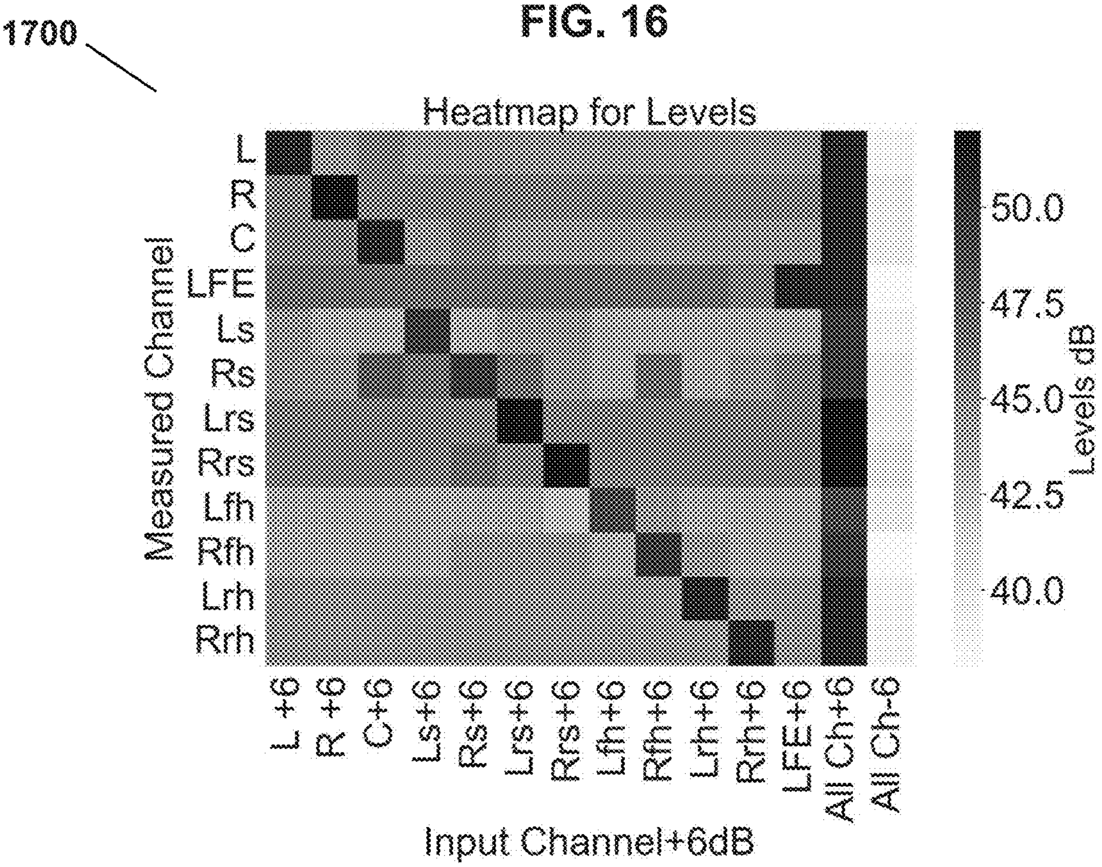
FIG. 17 illustrates an example level measurement heatmap for accuracy of measured levels using a smartphone App, according to some embodiments.

FIG. 17 illustrates an example level measurement heatmap 1700 for accuracy of measured levels using a smartphone App, according to some embodiments. Heatmap 1600 (FIG. 16) shows the comparison of the levels calculated using the simultaneous deconvolution processing/algorithm App versus with measurements performed using a sound level meter. Heatmap 1700 shows levels calculated by increasing the input to each channel by +6 dB (x-axis) and one can observe it reflected in the measured data (y-axis).

Real-time implementation of a speaker measurement smartphone app (for levels and delay) is a challenging process. One or more embodiments solve the challenge of using a high resolution FFT on device with an approach to deploy the calculations over a cloud environment-based processor/server. In some embodiments, circularly shifted log sine sweeps are time efficient and suitable for use. Another major challenge of having non-synchronized playback and recording systems is addressed using the statistical features from a high time-resolution spectrogram.

In some embodiments, the disclosed technology provides time alignment of an audio measuring/recording system with a separate playback system using automatically derived statistical features from a spectrogram. In one or more embodiments, the disclosed technology further provides spectrogram-based automatically derived start-time and end-time synchronization for system requiring alignment of a stimulus and recorded signal. Audio playback and recording systems may need synchronization due to manual, BLUETOOTH®, Wi-Fi or cloud computing based communication delay. Spectrogram based start and end-time synchronization can work on any system that may need alignment of the stimulus and the recorded signal. In some embodiments, the disclosed technology additionally provides loudspeaker tuning independent of stimulus, including at least one of pink noise, maximum length sequence (MLS), log sine sweeps, multitone, or random-white noise, and uses automatically derived statistical features of a spectrogram to evaluate start and stop times. One or more embodiments are independent of any stimulus that is used for loudspeaker tuning (i.e., the disclosed technology works for pink noise, MLS, log sine sweeps and multitone and random-white noise, etc. In cases with unknown stimuli, some embodiments use statistical properties of a spectrogram to evaluate start and stop times.

Figure 19:
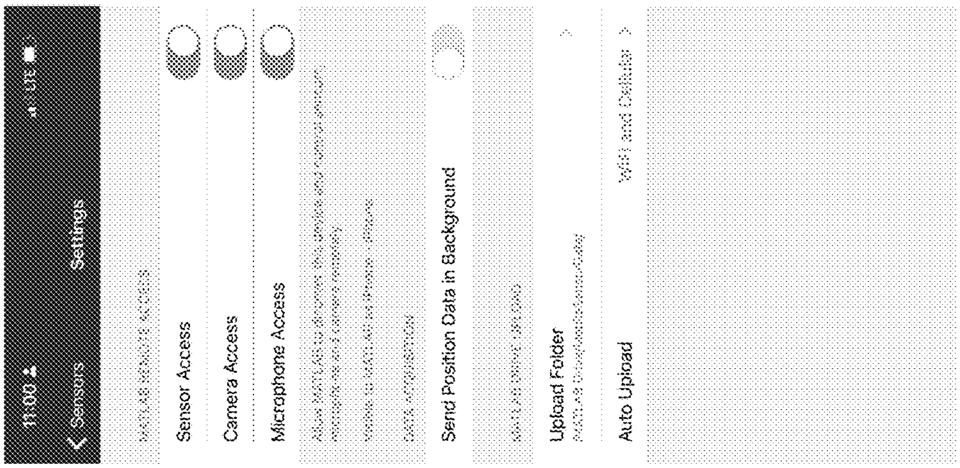
FIGS. 18-19 illustrate example screen displays of a smartphone App, according to some embodiments.
Figure 18:
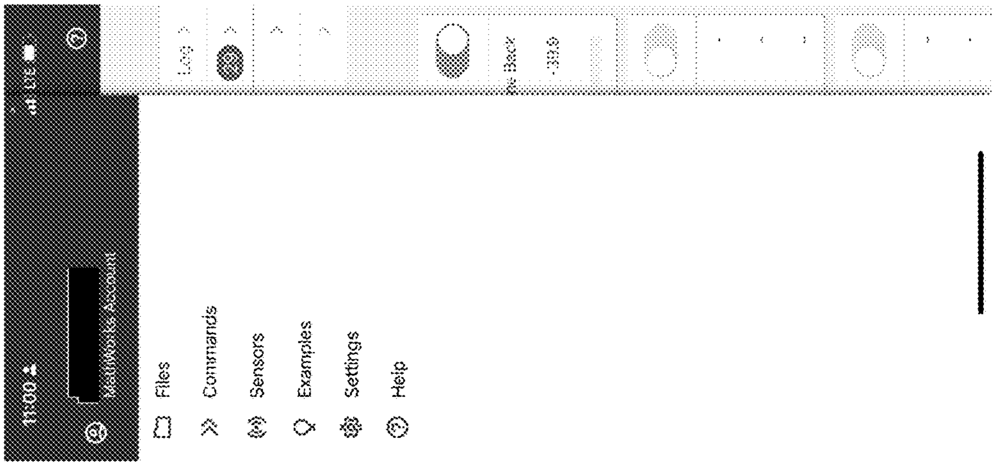

FIGS. 18-19 illustrate example screen displays 1800 and 1900 of a smartphone App, according to some embodiments. The simultaneous deconvolution processing/algorithm App implemented on a smartphone connects to a cloud computing environment (e.g., Math Works® Cloud). Screen display 1800 shows the display once connected to the cloud processing environment. Screen display 1900 shows an example settings screen.

Figure 22:
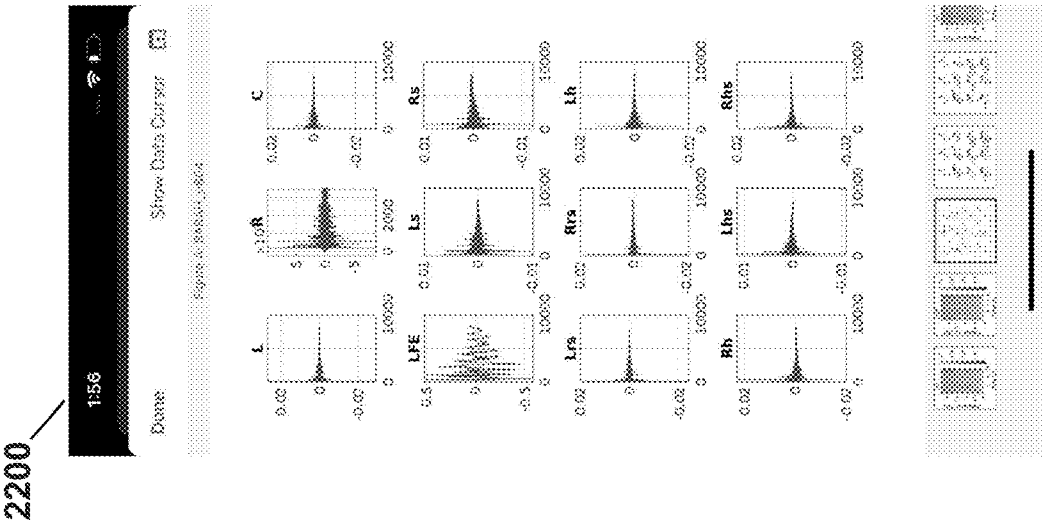
FIGS. 20-22 illustrate examples of screen displays for a smartphone App connected to a cloud computing environment showing the use of the disclosed technology, according to some embodiments.
Figure 21:
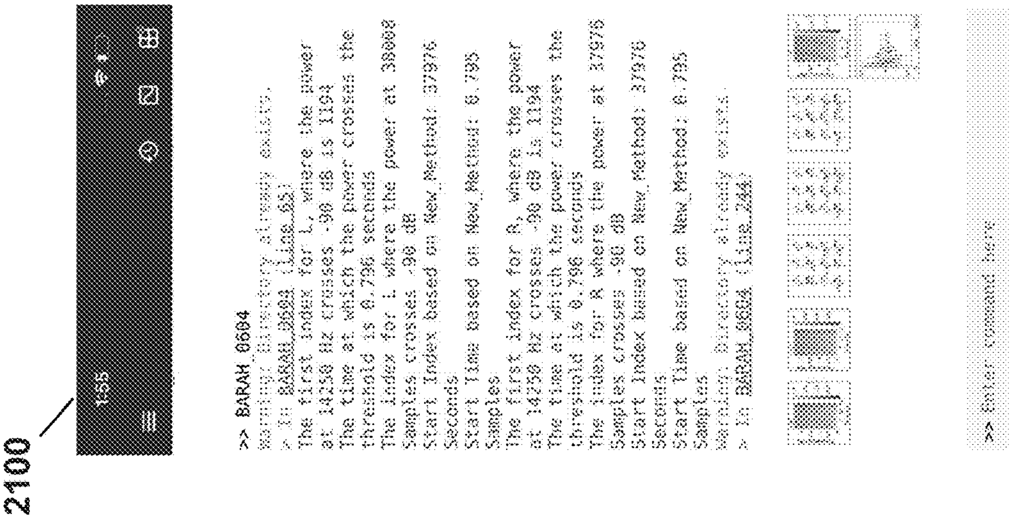
Figure 20:
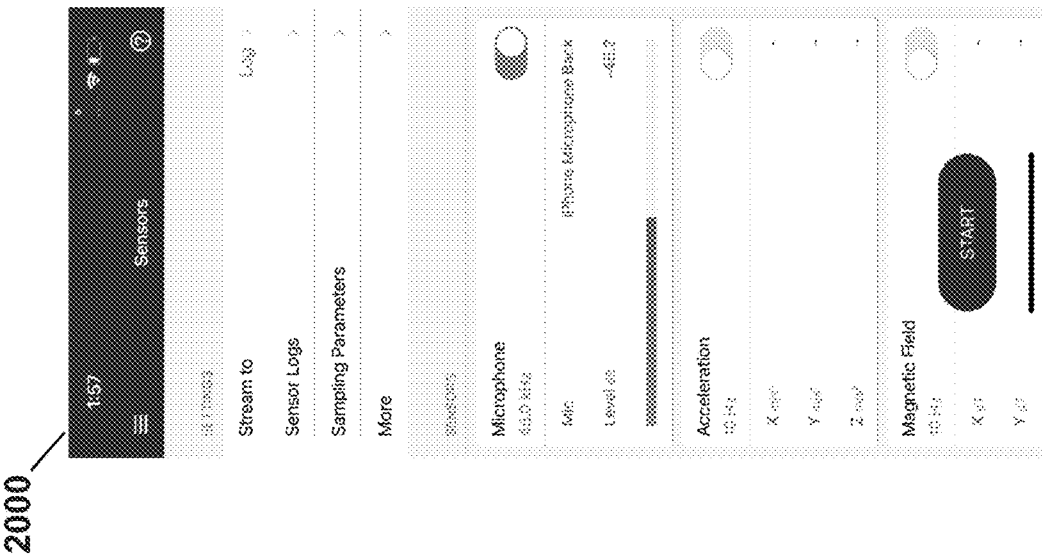

FIGS. 20-22 illustrate examples of screen displays for a smartphone App connected to a cloud computing environment showing the use of the disclosed technology, according to some embodiments. Screen display 2000 shows a sensor page with microphone from the smartphone turned on. Screen display 2100 shows data and information from use of the simultaneous deconvolution processing/algorithm App. Screen display 2200 shows impulse responses from use of the simultaneous deconvolution processing/algorithm App.

Figure 23:
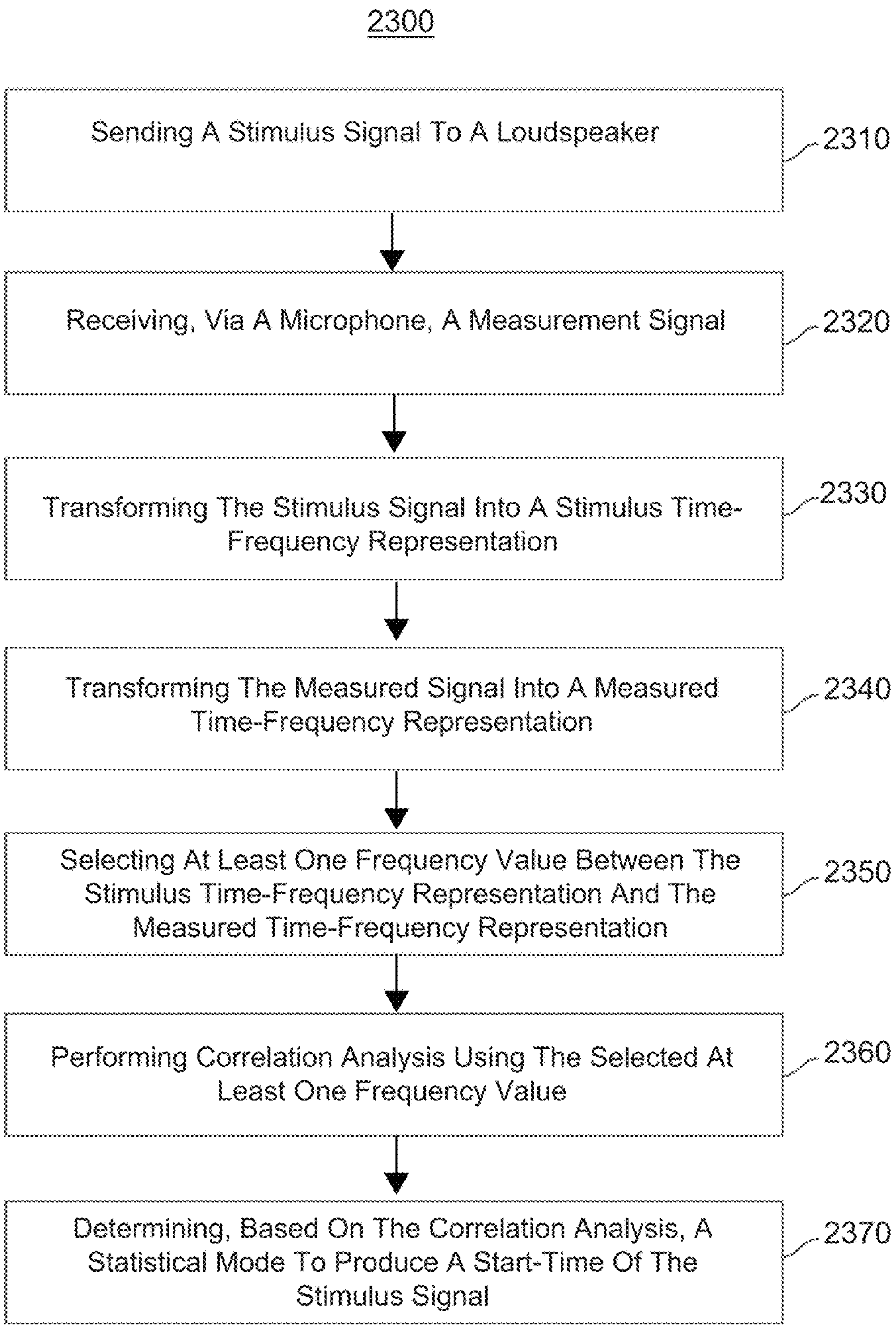
FIG. 23 illustrates a process for time alignment for independent recording and playback, according to some embodiments.

FIG. 23 illustrates a process 2300 for time alignment for independent recording and playback, according to some embodiments. In block 2310, process 2300 provides for sending a stimulus signal to a loudspeaker. In block 2320, process 2300 further provides for receiving, via a microphone, a measurement signal. In block 2330, process 2300 additionally provides for transforming the stimulus signal into a stimulus time-frequency representation. In block 2340, process 2300 still further provides for transforming the measurement signal into a measured time-frequency representation. In block 2350, process 2300 also provides for selecting at least one frequency value between the stimulus time-frequency representation and the measured time-frequency representation. In block 2360, process 2300 further provides for performing correlation analysis using the selected at least one frequency value. In block 2370, process 2300 provides for determining, based on the correlation analysis, a statistical mode to produce a start-time of the stimulus signal.

In some embodiments, process 2300 further includes the feature that the stimulus signal is played at one or more speakers.

In one or more embodiments, process 2300 additionally provides for calibrating time alignment for the one or more speakers based on the start-time.

In some embodiments, process 2300 further includes the feature that the measured signal is recorded at a computing device (e.g., a smartphone, tablet, etc.).

In one or more embodiments, process 2300 additionally includes the feature that the time alignment for the one or more speakers is calibrated for an audio measuring or recording system with a separate playback system and is based on one or more automatically derived statistical features from a spectrogram.

In some embodiments, process 2300 further includes providing tuning of the one or more speakers independent of the stimulus signal, including at least one of pink noise, maximum length sequence, log sine sweeps, multitone, or random-white noise. Process 2300 additionally includes providing a spectrogram-based automatically derived start-time and end-time synchronization for the audio measuring or recording system, where the audio measuring or recording system requires alignment of the stimulus signal and the measurement signal.

In one or more embodiments, process 2300 additionally includes the feature that the alignment of the stimulus signal and the measurement signal is required due to manual, BLUETOOTH®, Wi-Fi or cloud-based communication delay.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms “computer program medium,” “computer usable medium,” “computer readable medium”, and “computer program product,” are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean “one and only” unless explicitly so stated, but rather “one or more.” All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method for determining a start-time of a stimulus in a measurement, comprising:

sending a stimulus signal to a loudspeaker;

receiving, via a microphone, a measurement signal;

transforming the stimulus signal into a stimulus time-frequency representation;

transforming the measurement signal into a measured time-frequency representation;

selecting at least one frequency value between the stimulus time-frequency representation and the measured time-frequency representation;

performing correlation analysis using the selected at least one frequency value;

determining, based on the correlation analysis, a respective candidate start-time for each frequency bin of the time-frequency representations; and determining the start-time of the stimulus signal based on a statistical mode of the candidate start-times, wherein the statistical mode corresponds to a most frequently occurring candidate start-time among the candidate start-times.

2. The method of claim 1, wherein the stimulus signal is played at one or more speakers.

3. The method of claim 2, further comprising:

calibrating time alignment for the one or more speakers based on the start-time, wherein determining the start-time of the stimulus signal based on the statistical mode of the candidate start-times comprises excluding one or more outlier candidate start-times from the candidate start-times.

4. The method of claim 1, wherein;

the measurement signal is recorded at a computing device; and determining the respective candidate start-time for each frequency bin comprises identifying a peak in a correlation result for the respective frequency bin.

5. The method of claim 3, wherein the time alignment for the one or more speakers is calibrated for an audio measuring or recording system with a separate playback system and is based on one or more automatically derived statistical features from a spectrogram.

6. The method of claim 5, further comprising:

providing tuning of the one or more speakers independent of the stimulus signal, including at least one of pink noise, maximum length sequence, log sine sweeps, multitone, or random-white noise; and providing a spectrogram-based automatically derived start-time and end-time synchronization for the audio measuring or recording system, wherein the audio measuring or recording system requires alignment of the stimulus signal and the measurement signal.

7. The method of claim 6, wherein the alignment of the stimulus signal and the measurement signal is required due to manual, Bluetooth, Wi-Fi or cloud-based communication delay.

8. A non-transitory processor-readable medium that includes a program that when executed by a processor provides a start-time of a stimulus in a measurement, comprising:

sending, by the processor, a stimulus signal to a loudspeaker;

receiving, by the processor, via a microphone, a measurement signal;

transforming, by the processor, the stimulus signal into a stimulus time-frequency representation;

transforming, by the processor, the measurement signal into a measured time-frequency representation;

selecting, by the processor, at least one frequency value between the stimulus time-frequency representation and the measured time-frequency representation;

performing, by the processor, correlation analysis using the selected at least one frequency value;

determining, by the processor, based on the correlation analysis a respective candidate start-time for each frequency bin of the time-frequency representations; and determining, by the processor, the start-time of the stimulus signal based on a statistical mode of the candidate start-times, wherein the statistical mode corresponds to a most frequently occurring candidate start-time among the candidate start-times.

9. The non-transitory processor-readable medium of claim 8, wherein the stimulus signal is played at one or more speakers.

10. The non-transitory processor-readable medium of claim 9, further comprising:

calibrating, by the processor, time alignment for the one or more speakers based on the start-time, wherein determining the start-time of the stimulus signal based on the statistical mode of the candidate start-times comprises excluding one or more outlier candidate start-times from the candidate start-times.

11. The non-transitory processor-readable medium of claim 8, wherein:

the measurement signal is recorded at a computing device; and determining the respective candidate start-time for each frequency bin comprises identifying a peak in a correlation result for the respective frequency bin.

12. The non-transitory processor-readable medium of claim 10, wherein the time alignment for the one or more speakers is calibrated for an audio measuring or recording system with a separate playback system and is based on one or more automatically derived statistical features from a spectrogram.

13. The non-transitory processor-readable medium of claim 12, further comprising:

providing, by the processor, tuning of the one or more speakers independent of the stimulus signal, including at least one of pink noise, maximum length sequence, log sine sweeps, multitone, or random-white noise; and providing, by the processor, a spectrogram-based automatically derived start-time and end-time synchronization for the audio measuring or recording system, wherein the audio measuring or recording system requires alignment of the stimulus signal and the measurement signal.

14. The non-transitory processor-readable medium of claim 13, wherein the alignment of the stimulus signal and the measurement signal is required due to manual, Bluetooth, Wi-Fi or cloud-based communication delay.

15. An apparatus comprising:

a memory storing instructions; and at least one processor executes the instructions including a process configured to:

send a stimulus signal to a loudspeaker;

receive via a microphone, a measurement signal;

transform the stimulus signal into a stimulus time-frequency representation;

transform the measurement signal into a measured time-frequency representation;

select at least one frequency value between the stimulus time-frequency representation and the measured time-frequency representation;

perform correlation analysis using the selected at least one frequency value;

determine, based on the correlation analysis, a respective candidate start-time for each frequency bin of the time-frequency representations; and determine the start-time of the stimulus signal based on a statistical mode of the candidate start-times, wherein the statistical mode corresponds to a most frequently occurring candidate start-time among the candidate start-times.

16. The apparatus of claim 15, wherein the stimulus signal is played at one or more speakers.

17. The apparatus of claim 16, wherein:

the process is further configured to:

calibrate time alignment for the one or more speakers based on the start-time; and determining the start-time of the stimulus signal based on the statistical mode of the candidate start-times comprises excluding one or more outlier candidate start-times from the candidate start-times.

18. The apparatus of claim 15, wherein:

the measurement signal is recorded at a computing device; and determining the respective candidate start-time for each frequency bin comprises identifying a peak in a correlation result for the respective frequency bin.

19. The apparatus of claim 18, wherein the time alignment for the one or more speakers is calibrated for an audio measuring or recording system with a separate playback system and is based on one or more automatically derived statistical features from a spectrogram.

20. The apparatus of claim 19, wherein the process is further configured to:

provide tuning of the one or more speakers independent of the stimulus signal, including at least one of pink noise, maximum length sequence, log sine sweeps, multitone, or random-white noise; and provide a spectrogram-based automatically derived start-time and end-time synchronization for the audio measuring or recording system, wherein the audio measuring or recording system requires alignment of the stimulus signal and the measurement signal;

wherein the alignment of the stimulus signal and the measurement signal is required due to manual, Bluetooth, Wi-Fi or cloud-based communication delay.

* * * * *